(12) United States Patent
Wilson et al.

(10) Patent No.: US 8,677,320 B2
(45) Date of Patent: Mar. 18, 2014

(54) SOFTWARE TESTING SUPPORTING HIGH REUSE OF TEST DATA

(75) Inventors: Peter B. Wilson, Chicago, IL (US); Karen B. Johns, Chicago, IL (US)

(73) Assignee: Mosaic, Inc., Chicago, IL (US)

( * ) Notice: Subject to any disclaimer, the term of this patent is extended or adjusted under 35 U.S.C. 154(b) by 343 days.

(21) Appl. No.: 13/081,046

(22) Filed: Apr. 6, 2011

(65) Prior Publication Data
US 2012/0260129 A1  Oct. 11, 2012

(51) Int. Cl.
*G06F 9/45* (2006.01)

(52) U.S. Cl.
USPC ............................................. 717/124

(58) Field of Classification Search
USPC ............................................. 717/124
See application file for complete search history.

(56) References Cited

U.S. PATENT DOCUMENTS

| | | | |
|---|---|---|---|
| 5,751,941 A | 5/1998 | Hinds et al. | |
| 6,219,829 B1 | 4/2001 | Sivakumar et al. | |
| 6,353,897 B1 | 3/2002 | Nock et al. | |
| 6,601,233 B1 * | 7/2003 | Underwood | 717/102 |
| 6,609,128 B1 * | 8/2003 | Underwood | 707/610 |
| 6,633,888 B1 * | 10/2003 | Kobayashi | 1/1 |
| 6,732,296 B1 | 5/2004 | Cherny et al. | |
| 6,986,125 B2 | 1/2006 | Apuzzo et al. | |
| 7,464,297 B2 | 12/2008 | Potter, IV et al. | |
| 7,552,422 B2 | 6/2009 | Gerber et al. | |
| 2005/0268285 A1 | 12/2005 | Bagley et al. | |
| 2010/0114939 A1 | 5/2010 | Schulman et al. | |

OTHER PUBLICATIONS

Hartman, et al., Model Driven Testing—AGEDIS Architecture Interfaces and Tools, presented at 1st European Conference on Model Driven Software Engineering, Dec. 11-12, 2003, Nuremberg, Germany.

Poston, Automated Testing From Object Models, White Paper dated Jul. 1998, Aonix North America, Inc.

Veanes, et al., Model-Based Testing of Object-Oriented Reactive Systems with Spec Explorer, Feb. 5, 2007, Microsoft Research, Redmond, WA.

* cited by examiner

*Primary Examiner* — John Chavis
(74) *Attorney, Agent, or Firm* — Patzik, Frank & Samotny Ltd.

(57) ABSTRACT

A software testing system and method provides full reuse of software tests and associated test data in a centralized shared repository, including enabling the full reuse of test assets including test actions, test scenarios, test data; and automation scripts. Reusable test components consisting of test steps and the type of test data needed by those test steps, are managed and maintained. These components are assembled into reusable components with no binding of test data until execution time, thereby treating the test data as a reusable asset. A reusable test is initially defined using only an indication of a type or category of data, and not bound to the actual data itself, until it is assembled into an executable immediately prior to automated or manual test execution.

20 Claims, 15 Drawing Sheets

SOFTWARE TESTING SUPPORTING HIGH REUSE OF TEST DATA

BACKGROUND OF THE INVENTION

1. Field of Invention

The present invention relates, in general, to the testing of software and, in particular, to a system that maximizes reusability of testing components in both manual and automated testing. More particularly, the present invention goes beyond current data driven and keyword driven testing approaches by making test data fully reusable. This, in turn, makes other testing assets more reusable and serves to lower the cost of developing and maintaining test assets.

2. Description of Related Art

Fundamentally, software testing involves exercising a system, including software under test, with a known initial state and predefined input. The actual results of the system are compared with predefined expected results. Thorough testing requires exercising a system with many variations in both the sequence of actions performed and test data (i.e., predefined input or expected results). Software testing, especially manual testing, can be both tedious and labor intensive. Moreover, the nature of software development is that a system will need to be re-tested every time the system is modified in order to verify that modifications work as intended and do not introduce unforeseen defects in what is known as regression testing. Maintaining test cases can be expensive—much like maintaining a software system.

Automating testing execution to reduce test execution time and reusing testing components to cut test planning and maintenance costs are two of the most common strategies to reduce software testing costs. Data driven testing and keyword testing are two approaches for accomplishing this.

Data driven testing involves reading a table of data, such as from a spreadsheet, where each table row contains a record of test data (i.e., the predefined input and expected results). The advantages of data driven testing are the ability to easily add new conditions to the table and the ability to specify the test data separate from the test. Data driven testing enables a limited form of reuse. While the test can be reused with the different data conditions in the table, the table itself is closely bound to the test case and therefore the test cannot be easily reused with a different table of test data. Moreover, the test data must be customized to the specific test to be conducted and therefore test data (i.e., individual records of the table) are not easily reused. This, in turn, limits the ability to reuse the test data with different tests.

In contrast, keyword driven testing uses a keyword to represent a specific action (e.g., user login, data entry, check box actions, etc.). A test driver is written to read the keywords and execute test scripts associated with the keyword. Data is usually embedded in the test or in an external table as in data driven testing. Keyword driven testing provides a high level of reuse for the keywords/scripts, but, like data driven testing, the data is bound to the specific test being performed, so the test is not easily used with different data, and the data is not easily used with other tests.

While both data driven and keyword testing achieve some level of reuse, neither approach is designed to reuse the test data itself. Testing tools designed to be a repository of test cases, when they don't ignore data altogether, typically either imbed test data in the test case or in external datasheets. These approaches force test data to be designed around a specific test, binding the test data to the specific test and thus limiting the reusability of the test and making the reusability of the test data impractical. Another issue with organizing test data around individual tests is that it can be difficult to determine if a given test condition is, in fact, tested. When test data is spread over numerous spreadsheets or other data sources and imbedded as parameters in tests, it becomes impractical to determine if a given condition is tested and, if so, where it is tested. This non-reusable test data is thus difficult to maintain and works to lower the reusability of the associated tests and scripts.

BRIEF SUMMARY OF INVENTION

The present invention enables full reuse of software tests and associated test data in a centralized shared repository. In particular, the present invention enables full reuse of the following test assets: test actions (which define individual test steps); test scenarios (groupings of actions and scenarios); test data; and automation scripts. Unlike prior art software testing practices and tools that bind test data to the tests as they are defined, thereby limiting the reusability of the tests; and that bind test data in the form of data sheets specific to a test or parameters specific to a keyword, the present invention manages and maintains a complete reusable test component consisting of test steps and the type of test data needed by those test steps. These components can be assembled into any number of reusable components with no binding of test data until execution time, thereby treating the test data as a reusable asset. When a test is defined, it is associated with the data category that contains that data. Optionally the specific data field within that category can also be specified. Accordingly, the present invention permits a reusable test to be defined with the type or category of data, but not bound to the actual data itself, until it is assembled into an executable immediately prior to automated or manual test execution. The present invention facilitates categories of test data that are reusable and shared across test assets and organizes parameter data so it is also shared and readily assigned. The present invention accordingly allows data to be organized around the needs of the application rather the needs of a specific test.

Essentially, the present invention retains the reusability of the tests and test data by delaying any binding of tests to test data until execution. When a test is ready for execution, the reusable components (tests with specified data categories and fields) are assembled into executables. At this point the present invention interactively provides an indication to the tester of the types of test data that are needed for test execution, and allows the tester to select from the available data of that type to provide actual data for the test execution.

The categories of test data are maintained in the same repository and any updates are dynamically reflected in the data assigned to the tests. The maintenance of the relationships between test data and tests in this manner enables the sharing of the test data and facilitates maintenance of the test data that is reflected instantly in the test data and the executable tests.

The present invention retains the relationship between the automation scripts and tests and their data, to enable: self-documenting scripts; continued ability to manually execute tests that have been automated; simplified maintenance of the assigned data for both the manual and automated tests; and the creation of new automated tests by sequencing manual tests together that have automated components.

In an embodiment of the present invention, a system is provided for testing a software application supporting reuse of test assets. The system comprises a testing repository database, storing reusable action object data, test step object data, predetermined categories of test data, reusable test scenario object data, and test driver information. The system provides a user interface, permitting a user to construct a test plan by assembling together at least one of a plurality of reusable action objects and a plurality of reusable scenario objects in a sequence to create a plurality of reusable test executable step objects collectively forming a test executable, the reusable test executable step objects having associated predetermined categories of test data. The system further provides means for late binding instances of actual test data to the predetermined categories of test data following completion of test planning and immediately prior to test execution. At least one of the test steps includes a data template. Moreover, the means for late binding instances of actual test data comprises populating the data templates associated with test steps with corresponding instances of actual data.

In an embodiment of the present invention, a method is provided for testing a software application supporting reuse of test assets. The includes the step of providing a testing repository database storing reusable action object data, test step object data, predetermined categories of test data, reusable test scenario object data, and test driver information. The method further includes the step of providing a user interface permitting a user to construct a test plan by assembling together at least one of a plurality of reusable action objects and a plurality of reusable scenario objects in a sequence to create a plurality of reusable test executable step objects collectively forming a test executable, the reusable test step objects having associated predetermined categories of test data. The method further comprises the step of assigning instances of actual test data to the predetermined categories of test data. Following completion of test planning and immediately prior to test execution the assigned instances of actual test data are bound to the executable test. In this embodiment, the categories of test data are represented by data templates and data is assigned when at least one of the test steps includes a data template. Moreover, the step of late binding instances of actual test data comprises the step of populating the data templates associated with test steps with corresponding assigned instances of actual data.

DETAILED DESCRIPTION OF INVENTION

Figure 1:
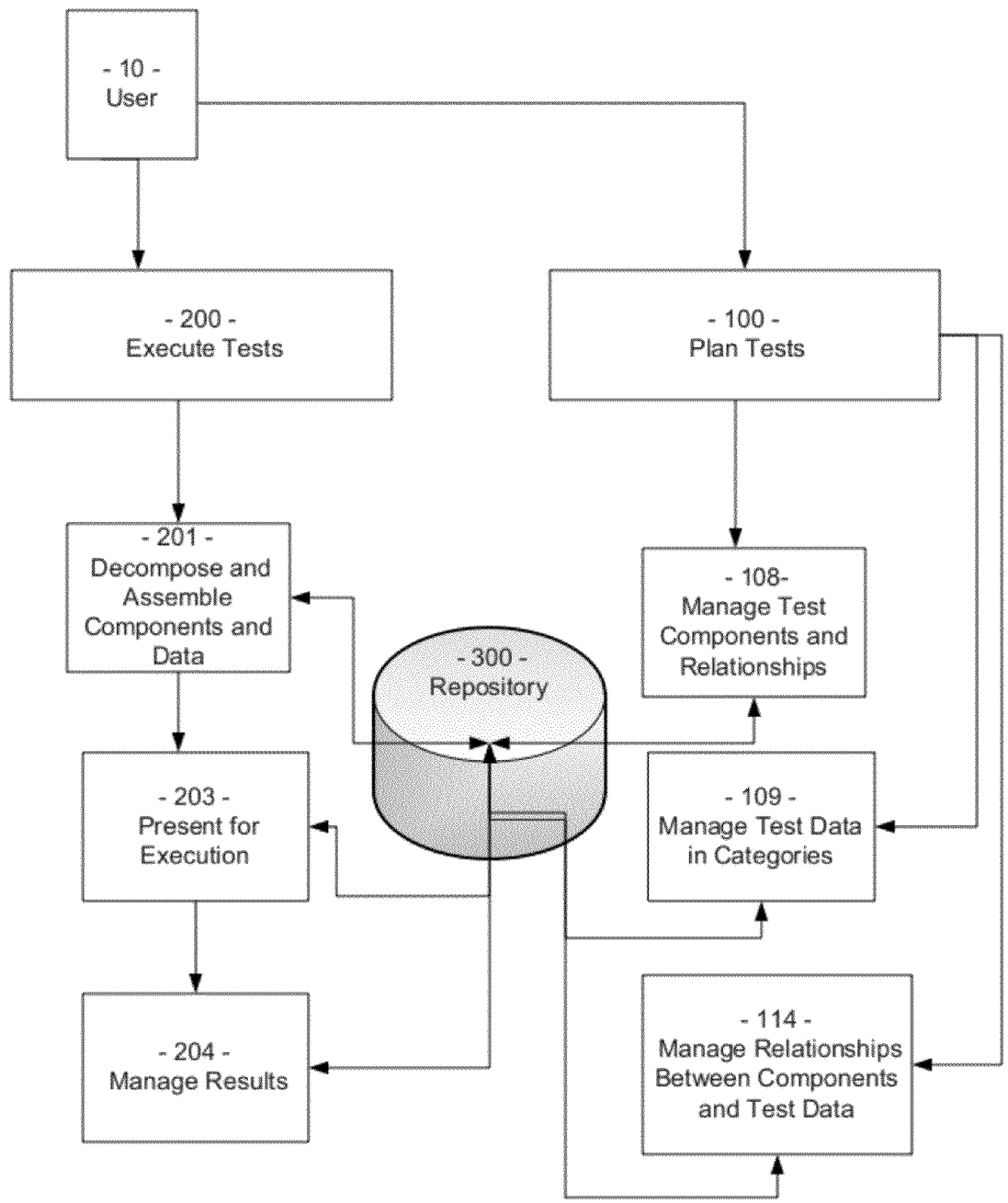
FIG. 1 is a block diagram of the overall functionality provided by the present invention.

As shown in FIG. 1, the present invention manages test components and their interrelationships to permit a user 10 who could be a tester, automation engineer, developer or end user charged with testing to perform software test planning (denoted as test planning function 100) and execute software tests (denoted as test execution function 200) in a manner that enhances test data and test component reusability, thereby improving the user's productivity. To facilitate test planning function 100, the present invention provides a graphical user interface via a computer or workstation for the user to create and enter data for reusable test components, denoted as test component and relationship management function 108. These test components are managed in repository 300, which is also employed to manage the relationships among the various test components.

In a preferred embodiment, repository 300 accordingly comprises a relational database, which may be hosted on either a workstation or server using conventional relational database software. The invention manages test data, which may be organized by user 10 into various categories, and is denoted by test data management within categories function 109. Prior to execution, test data management within categories function 109 allows user 10 to assemble the reusable test components together with reusable test data components of the categories related to the test components, and then manage the relationship of those test components to the selected test data to enable test execution, as shown in function 114. Upon test execution, components and data required for the test are decomposed and assembled in function 201, and then presented for execution in function 203. Following test execution, results are managed in function 204.

Figure 2:
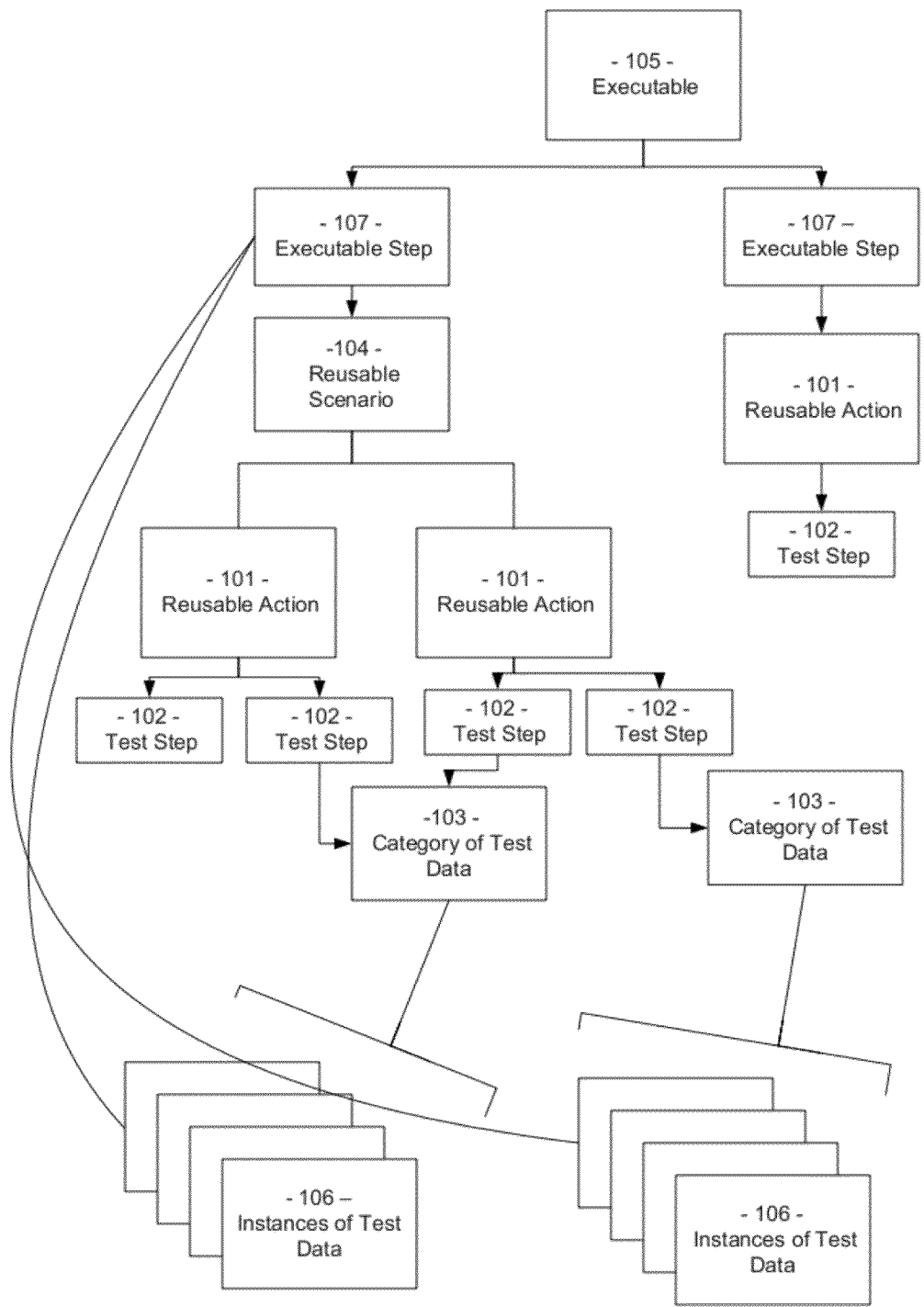
FIG. 2 is a block diagram of the basic components managed by an embodiment of the invention.

Referring to FIG. 2, the invention manages, under user input and direction, a plurality of reusable action objects 101, which collectively serve as building blocks for the necessary test executions. Reusable action objects 101 contain one or more test step objects 102. Each test step object 102 describes an actual step to be performed in the testing process, together with an identification of expected results of the step that is to be completed and verified upon test execution. This verification can be accomplished manually or, in the case of a more automated test, by an automated script at execution time. Each test step object 102 within a reusable action object 101 may be associated with one or more predetermined categories 103 of test data, representing the data that will be entered or used for verification during execution of the 102 Test Steps. As shown in FIG. 2, one or more instances 106 of test data, each associated with a particular predetermined category 103 of test data, will be used at test execution time as the input and/or expected results for an associated test step object 102 of a reusable action object 101. One or more instances 106 of test data are associated with each predetermined category 103 of test data in order to provide this capability.

With further reference to FIG. 2, to create tests that are generally larger in scale, a plurality of reusable action objects 101 can collectively be assembled into one or more reusable scenario objects 104. Moreover, a reusable scenario object 104 can further be assembled with other reusable action objects 101 and/or other reusable scenario objects 104 to create even larger, aggregated reusable scenario objects 104. As reusable scenario objects 104 are created, the present invention manages all of the relationships between constituent objects, such that a reusable scenario 104 also inherits, via iterative programming techniques, all the predetermined categories 103 of test data associated with all reusable action objects 101 that are in a reusable scenario object 104, either as a direct component or an indirect component inherited through another reusable scenario object 104. A given scenario object 104 may be constructed to contain other scenario objects 104 (i.e., scenario objects 104 may be nested).

With continuing reference to FIG. 2, when user 10 is ready to execute a test, reusable action objects 101 and/or reusable scenario objects 104 are assembled together in any desired sequence to create executable steps 107, contained within executables 105. Through the entire test structure, all assemblies employed to create higher level components retain the identity of the original, or base reusable component, and simply add a new relationship that is managed. Accordingly, each executable step 107 of each overall executable 105 also has relationships extending down to the individual test step objects 102 of the reusable action objects 101 that are inherited, either directly or indirectly, through a reusable scenario 104 associated with it, along with the predetermined categories 103 of test data associated with those test steps. Prior to executing an executable 105, one or more instances 106 of test data will be associated for each predetermined category 103 of test data required by each executable step 107 within the executable 105

Figure 3:
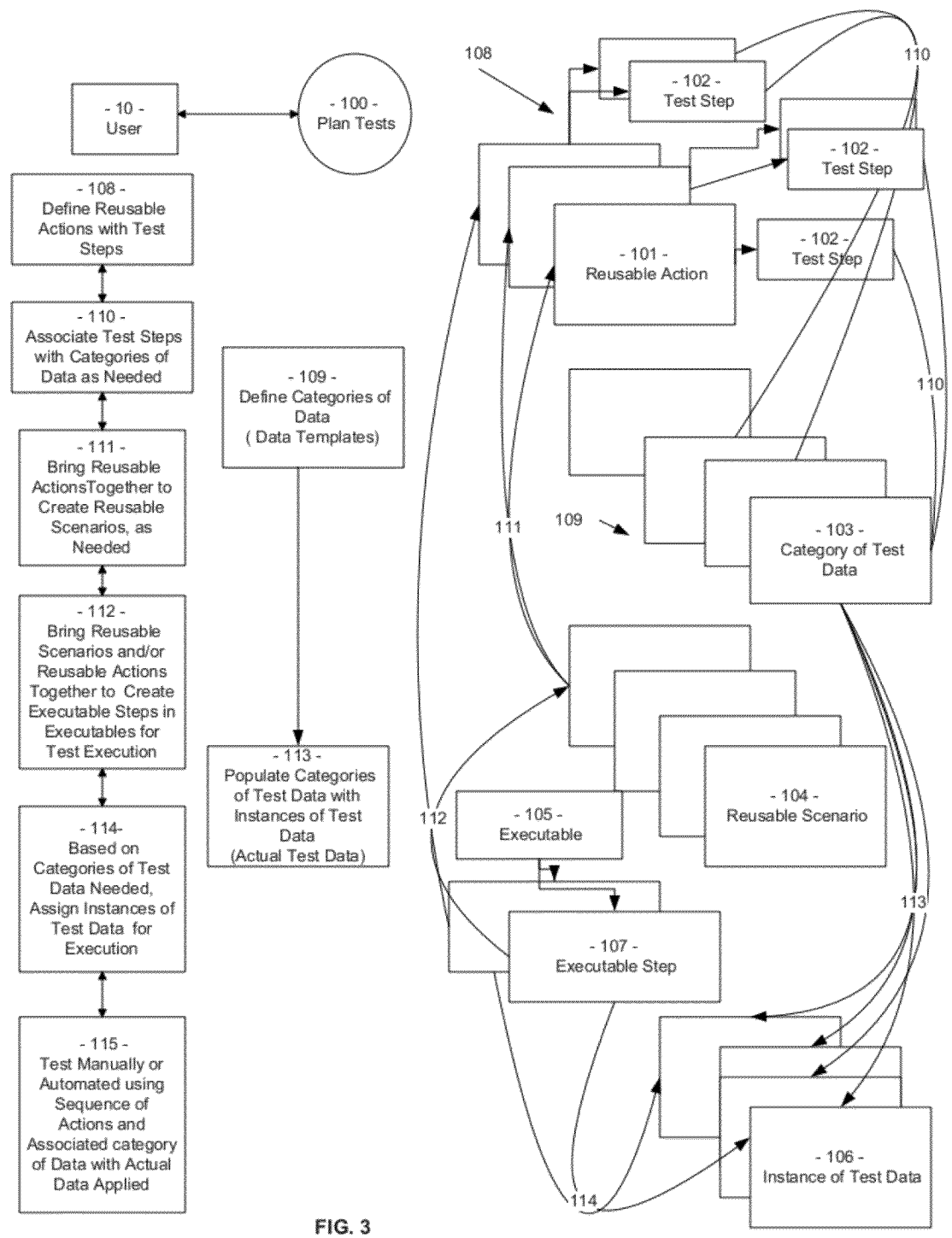
FIG. 3 is a flowchart of test planning in accordance with an embodiment of the present invention and showing, in particular, the planning of fully reusable tests ready for execution.

FIG. 3 illustrates an exemplary test planning flow supported by the present invention and its associated graphical user interface. The invention enables a user 10 to create test plans 100. First, in function 108, reusable action objects 101 are defined by user 10 with test step objects 102. In parallel, in function 109, test data is defined and is organized into logical predetermined categories 103. Once logical predetermined categories 103 are defined, user 10 can employ the present invention to select particular logical predetermined categories 103 to associate with individual test steps objects 102 as needed for those test step objects 102 requiring test data.

Figure 7:
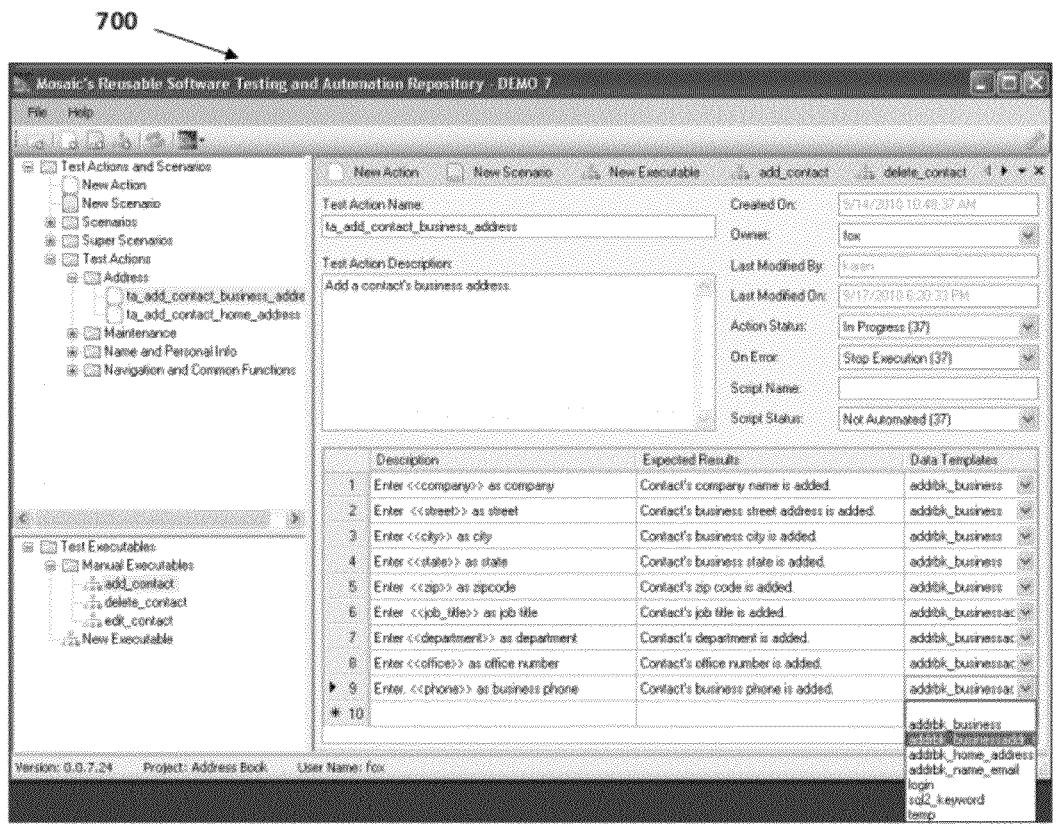
FIG. 7 is a screen capture of an exemplary application-under-test window of the present invention showing, in particular the capture of the lowest level reusable component with its association to the reusable data component.
Figure 8:
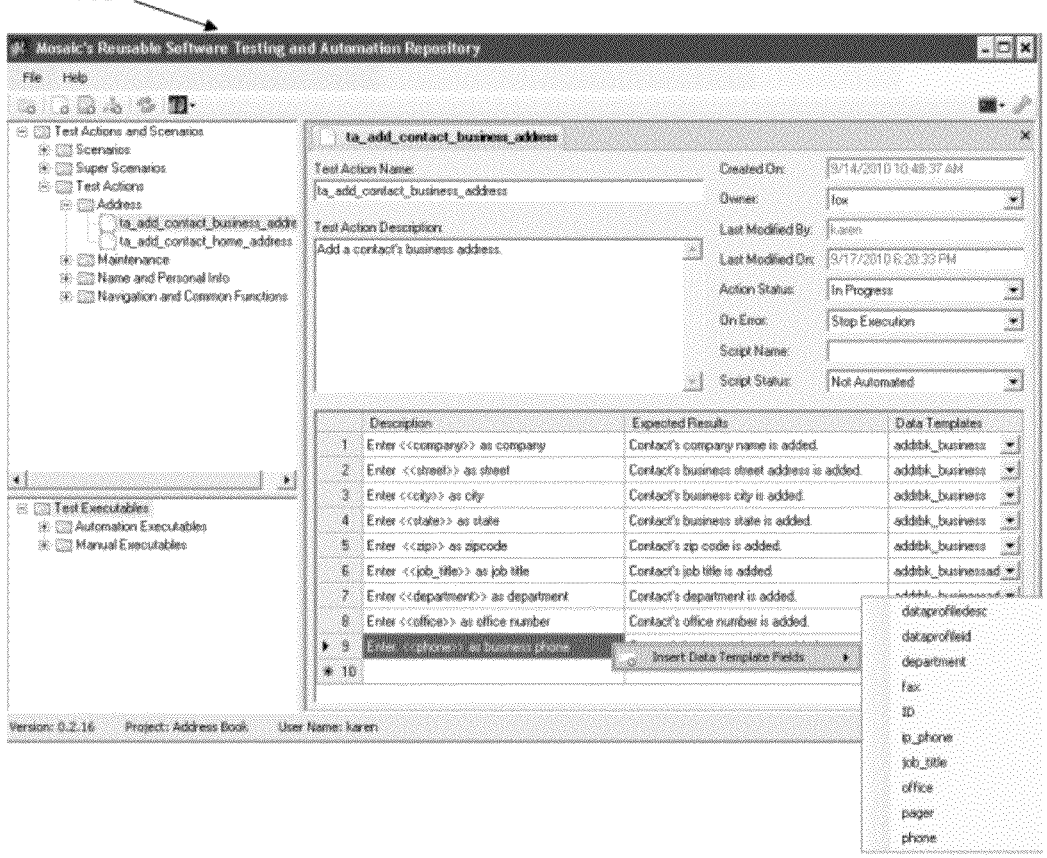
FIG. 8 is screen capture of the exemplary application-under-test window of FIG. 7 showing, in particular, specifics related to the reusable data component.

FIG. 7 illustrates use of the invention's graphical user interface for associating predetermined categories 103 of data with individual test step objects 102. As shown in FIG. 7, a drop-down selection box lists all of the previously-created and available predetermined categories of data 103 available for association with a particular test step object 102. A user may employ this drop-down selection box to select a particular predetermined category of data that will contain the needed data for a given test step object 102. FIG. 8 then illustrates using the invention's graphical user interface 700 to indicate a specific data item contained within a selected predetermined category 103 of test data that is required by the test step that is currently being further defined by the user. This inserts a parameter for the data item to aid in test execution. These actions are denoted in FIG. 3 as association function 110.

Referring back to FIG. 3, to create the tests necessary for execution to test the present system-under-test, following the definition of reusable actions with test steps in function 108 and the association of test steps with categories of data as needed in function 110, user 10 uses the graphical user interface of the invention to perform reusable scenario creation function 111, dragging graphical depictions of reusable action objects 101 together in order to graphically create reusable scenario objects, as needed. Next, in executable creation function 112, the user employs the graphical user interface to create executables 105 dragging reusable scenario objects 104 and/or reusable action objects 101 together to create the individual executable steps 107 that collectively form an executable 105. In parallel or in preparation for test execution, the user performs function 113, populating the predetermined categories 103 of test data with instances 106 of test data available in the invention.

Figure 9:
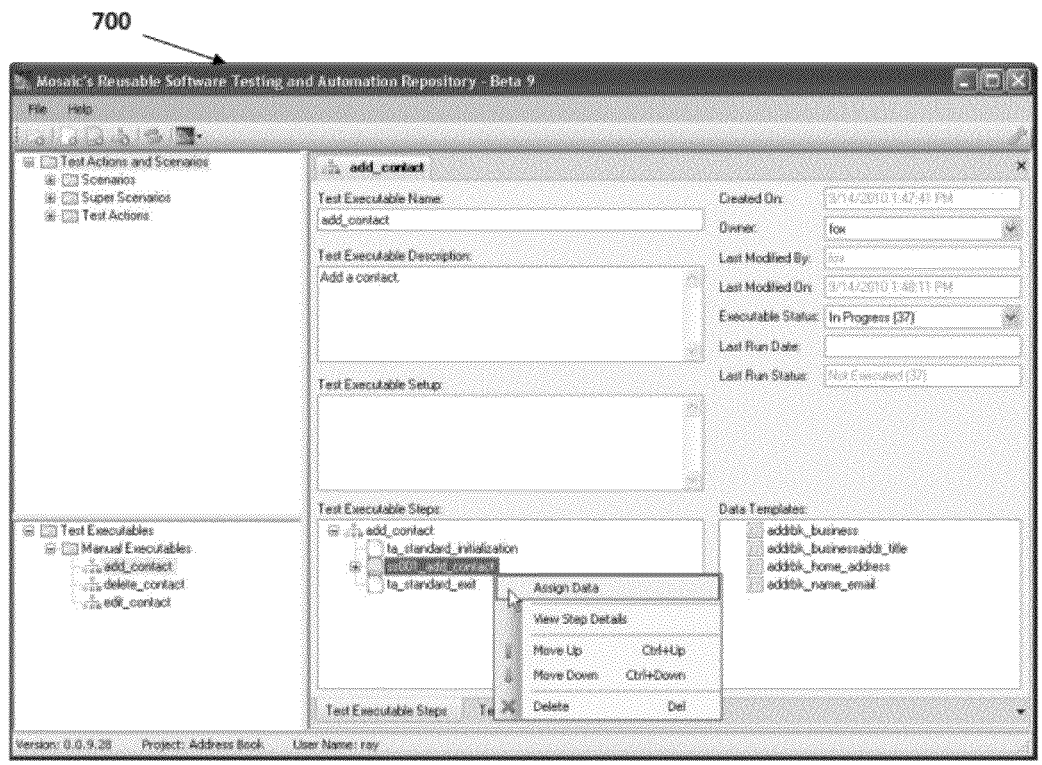
FIG. 9 is a screen capture of an exemplary application-under-test window of the present invention showing, in particular, the reusable test components assembled for execution with a request to associate actual data values.
Figure 10:
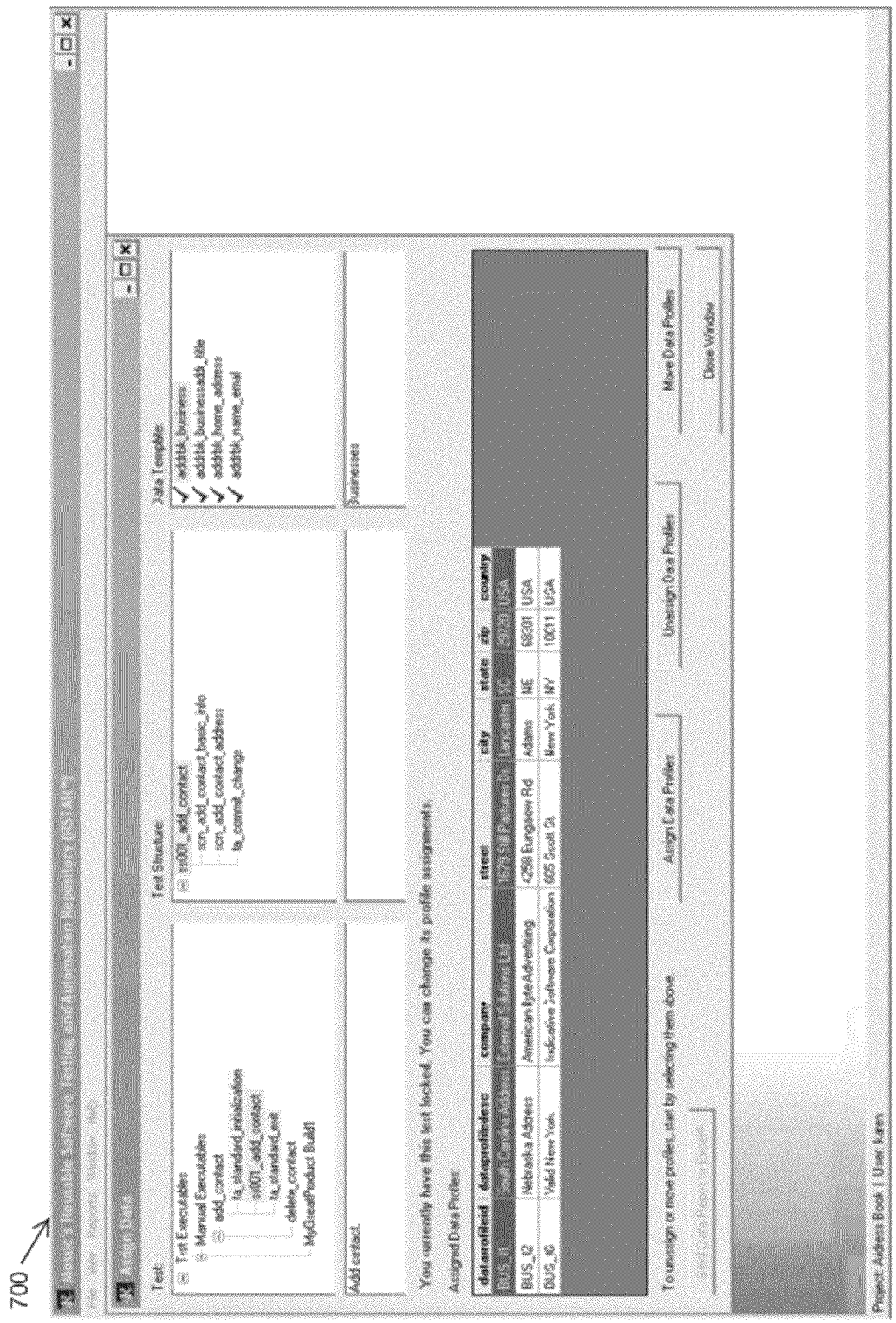
FIG. 10 is a pictorial representation of an exemplary application-under-test window that illustrates actual data assigned to a set of assembled components that are prepped for execution.
Figure 11:
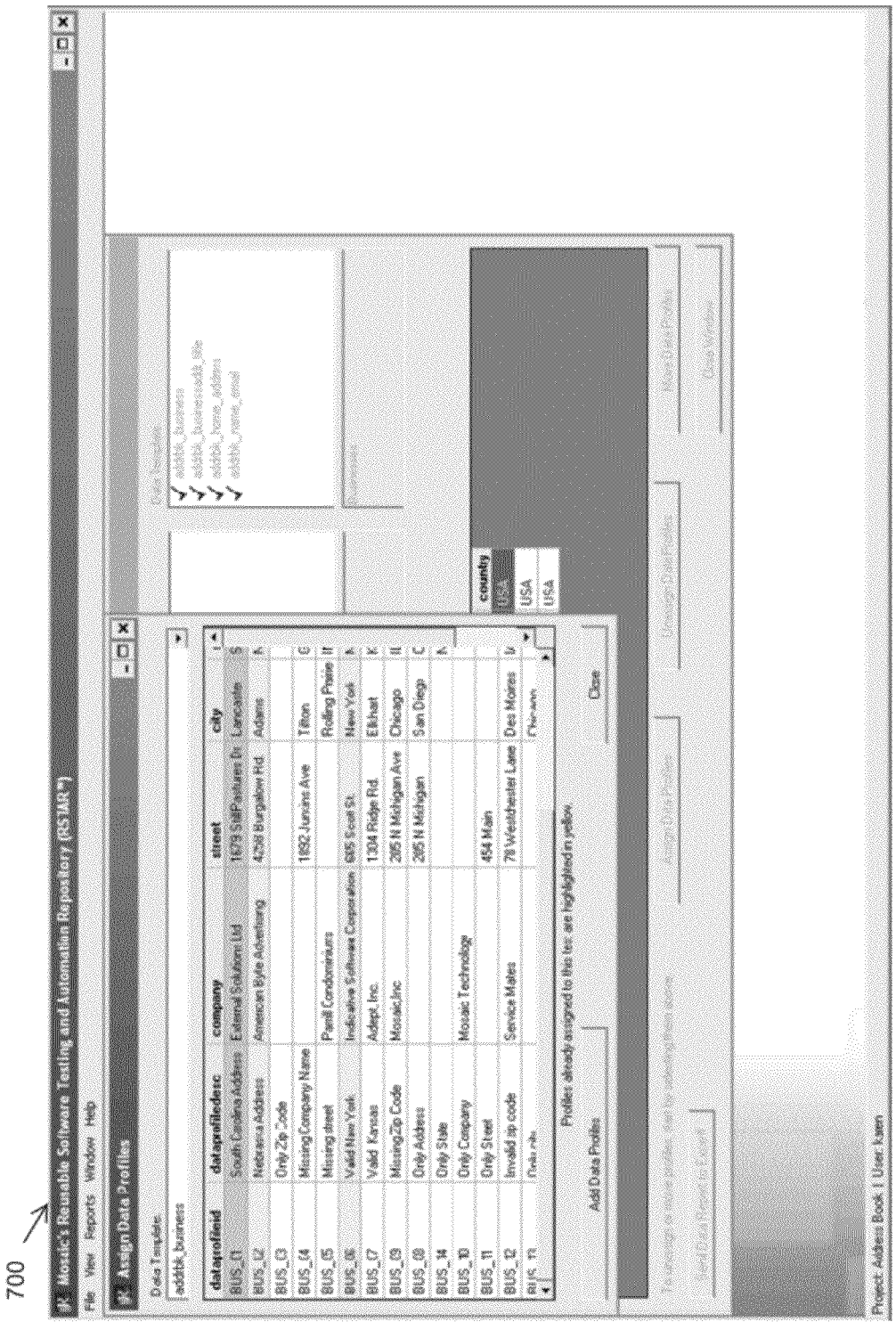
FIG. 11 is a pictorial representation of an exemplary application-under-test window that illustrates the association of actual data to a set of assembled components that are prepped for execution.

Prior to test execution, the user performs function 114, as shown in FIG. 3. Based on the predetermined categories 103 of test data that the graphical user interface indicates to the user are required for test execution, the user employs the graphical user interface to assign instances 106 of test data to each executable step 107 within executable 105 that requires that requires test data. FIG. 9 illustrates a user employing graphical user interface 700 to request an assignment of actual data. A user action, such as a right click on a mouse or other pointing or input device, is performed by the user to request the data assignment function to assign particular data to an executable step 107. FIG. 10 then illustrates a user employing graphical user interface 700 to assign the data. Graphical user interface 700 displays the structure of reusable test components and the predetermined categories 103 of test data that are required. The user clicks on or otherwise selects an assign data function, which causes the user interface to provide access to the available instances 106 of test data for the presently selected predetermined category 103 of test data as illustrated in FIG. 11. Graphical user interface 700 permits the user to select instances 106 of test data, and the invention then makes the necessary associations to the executable step 107 that is presently under creation. When all such assignments are complete, executable 105 is considered ready for execution. As shown by function 115 of FIG. 3, the user may elect to perform a test manually, or in an automated fashion, using sequences of predetermined actions together with predetermined categories of data, with actual data being applied, or late-bound, at the time of test execution.

Figure 4:
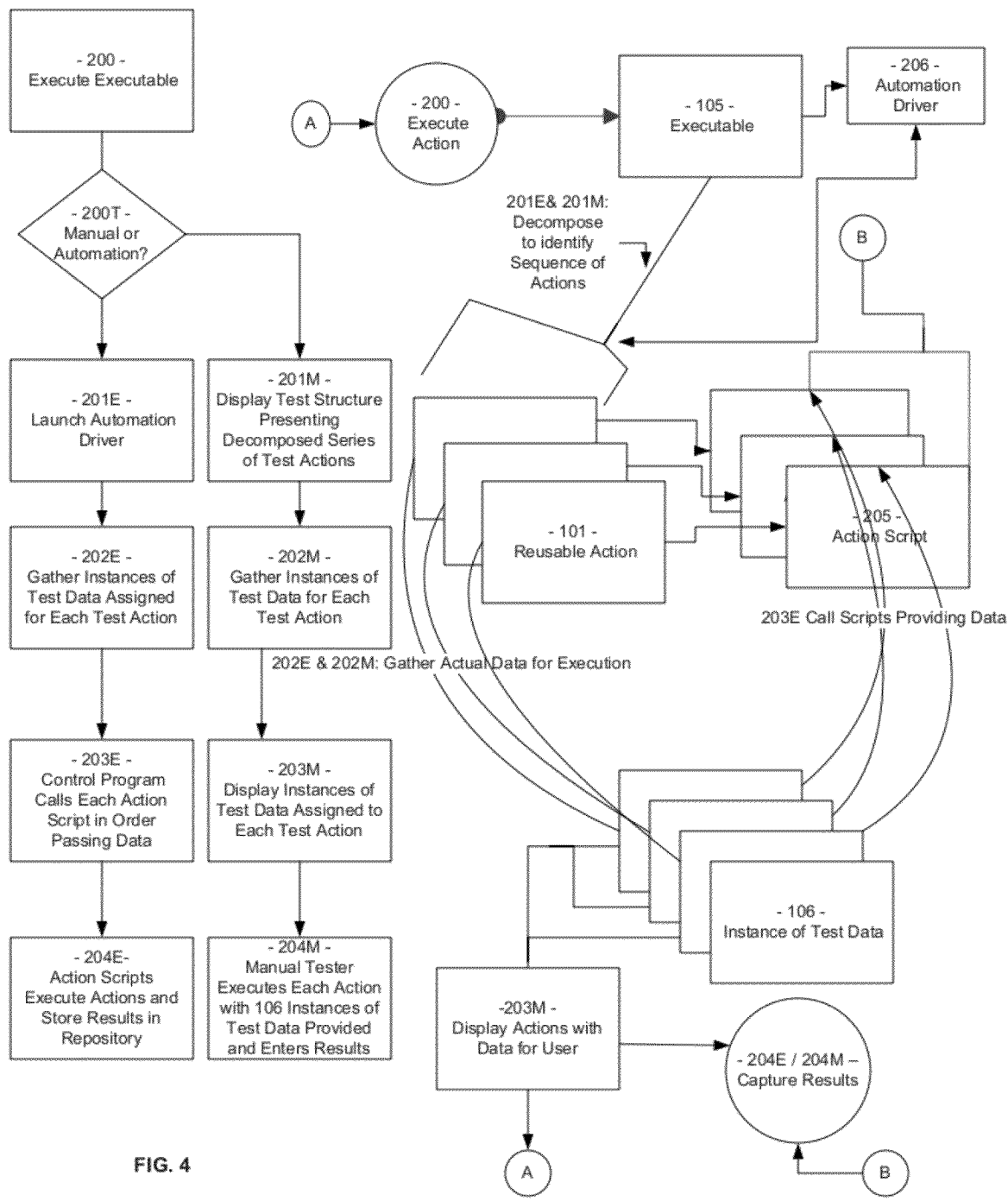
FIG. 4 is a flowchart of the execution process for both automated and manual testing of tests pursuant to an embodiment of the invention.

FIG. 4 illustrates test execution support functions provided by the present invention. Using a given test executable 105, test execution may be performed either manually, or in an automated fashion. Within FIG. 4, reference numerals having a suffix of "M" are employed to denote functions associated with manual testing operations, and reference numerals having a suffix of "E" are employed to denote functions associated with electronic, or automated testing. In step 200T, a test is made to determine if the user has elected manual testing (whereby transition is taken to function 201M) or automated testing (whereby transition is taken to function 201E). For automated execution, as shown in function 201E, the invention launches automation driver 206, which can be any executable program specified by the user. The invention provides Dynamic Link Libraries ("DLLs") that may be called from automation drivers specified by the user. In response, the invention will, within function 202E, provide access to a list of action scripts 205 and instances 106 of test data that the user specified during the previously-described test planning process. This information can be used in function 203E to call the action scripts 205, passing the previously defined instances 106 of test data to the scripts. DLLs are also provided to function 204E in order to store the results of the various test steps in the repository database.

With continuing reference to FIG. 4, manual test execution runs in similar fashion to automated test execution. For manual test execution, beginning with function 201M, the graphical user interface of the present invention displays the overall test structure, by presenting a decomposed series of test actions from executable 105. Test actions are made up of test steps, with each test step containing, in general, a description, expected result, and an associated data template, if required for the particular test step. Next, in function 202M, instances 106 of test data associated with each executable step contained within executable 105 are gathered. Next, in action 203M, these instances 106 of test data assigned with each test step 102 are displayed. Next, in function 204M, the user completes each test step 102, manually entering the actual results via the graphical user interface, which are captured in the repository database.

Figure 5:
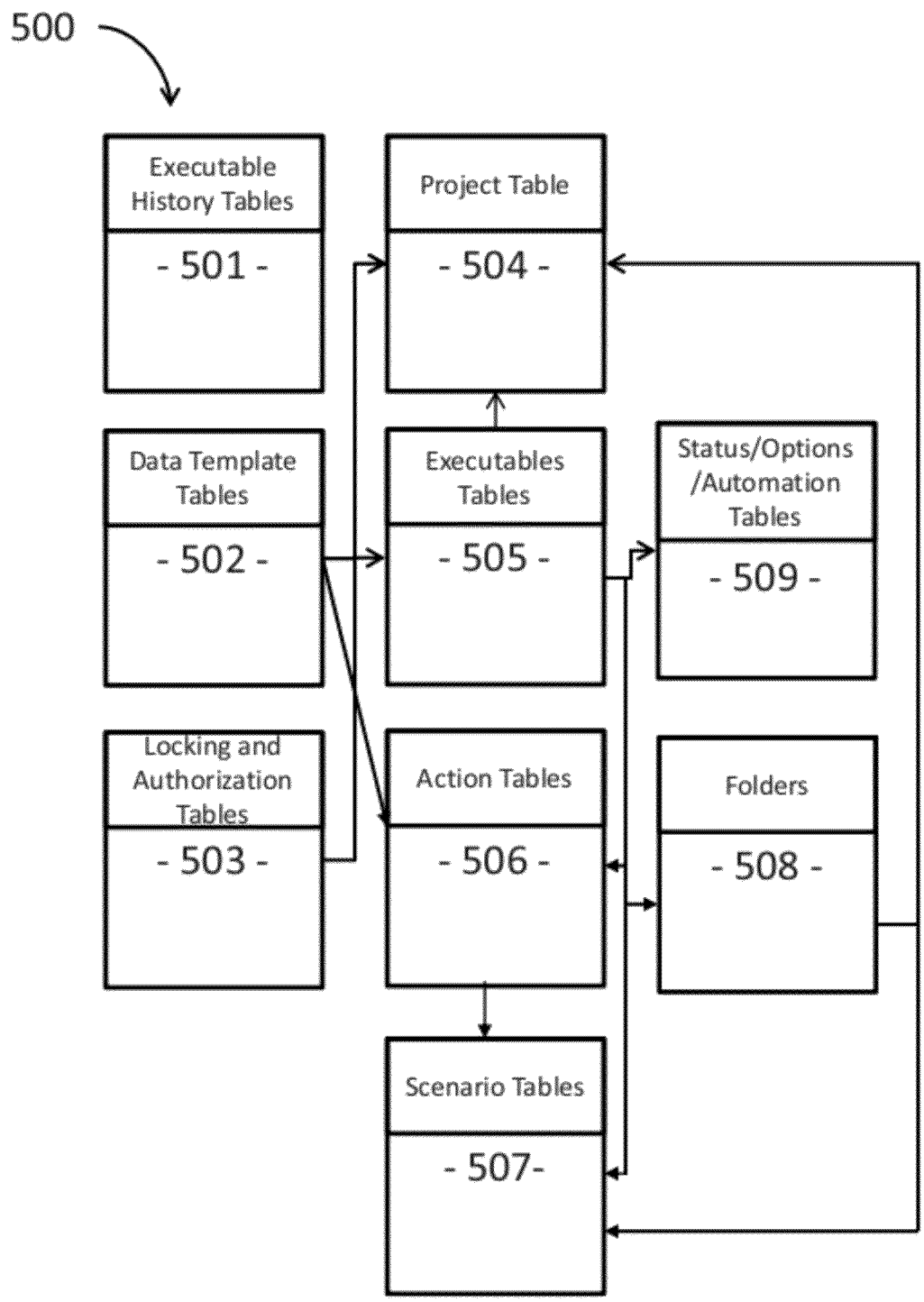
FIG. 5 is a high-level schema of a database of the present invention.
Figure 6A:
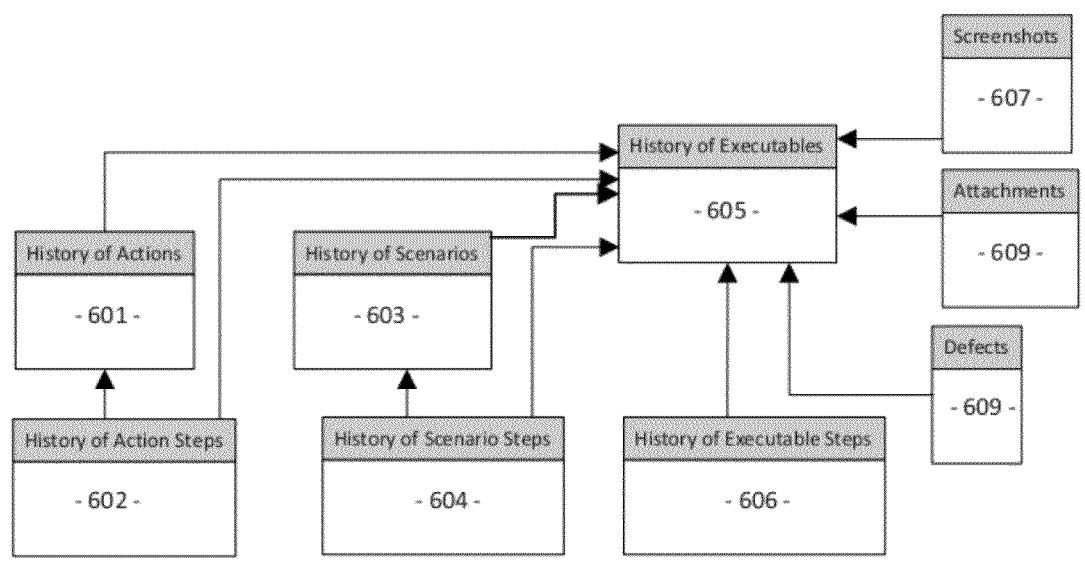
FIGS. 6A through 6C are collectively a high level representation of primary database tables employed by an embodiment of the present invention, with FIGS. 6B and 6C collectively forming a single diagram through connectors A, B and C of each Figure.

A high level database schema 500 for the repository of the present invention is shown in FIG. 5 as including executable history tables 501, data template tables 502, locking and authentication tables 503, project table 504, executable tables 505, action tables 506, scenario tables 507, folder tables 508, status, options and automation tables 509. The execution history database tables of a preferred embodiment of the present invention that are used during an execution run, and to review prior execution run history, will now be described in further detail with reference to FIG. 6A. These tables, in general, are employed to keep track of each execution run and their details, such as actual results, screenshots (or screen captures), and any defects identified.

In particular, history of action table 601 contains high-level information relating to actions in execution runs of executables. History of action steps table 602 contains information relating to all action steps for those actions. History of scenarios table 603 contains high-level information relating to scenarios involved in the execution runs. History of scenario steps table 604 contains information relating to all scenario steps associated with those scenarios. History of executables table 605 contains high-level information relating to executable instances during execution runs. History of executable steps table 606 contains information pertaining to all executable steps for those executable instances. Screenshots table 607 contains information, in the form of file names and paths, to screenshots that a user may have elected to attach to an execution run for future reference. Attachments table 608 contains file name and path information for attachment files that a user may have elected to attach, or associate, with a given execution run. Defects file 609 contains defects, and allows a user to associate defects with a particular execution run.

Figure 6B:
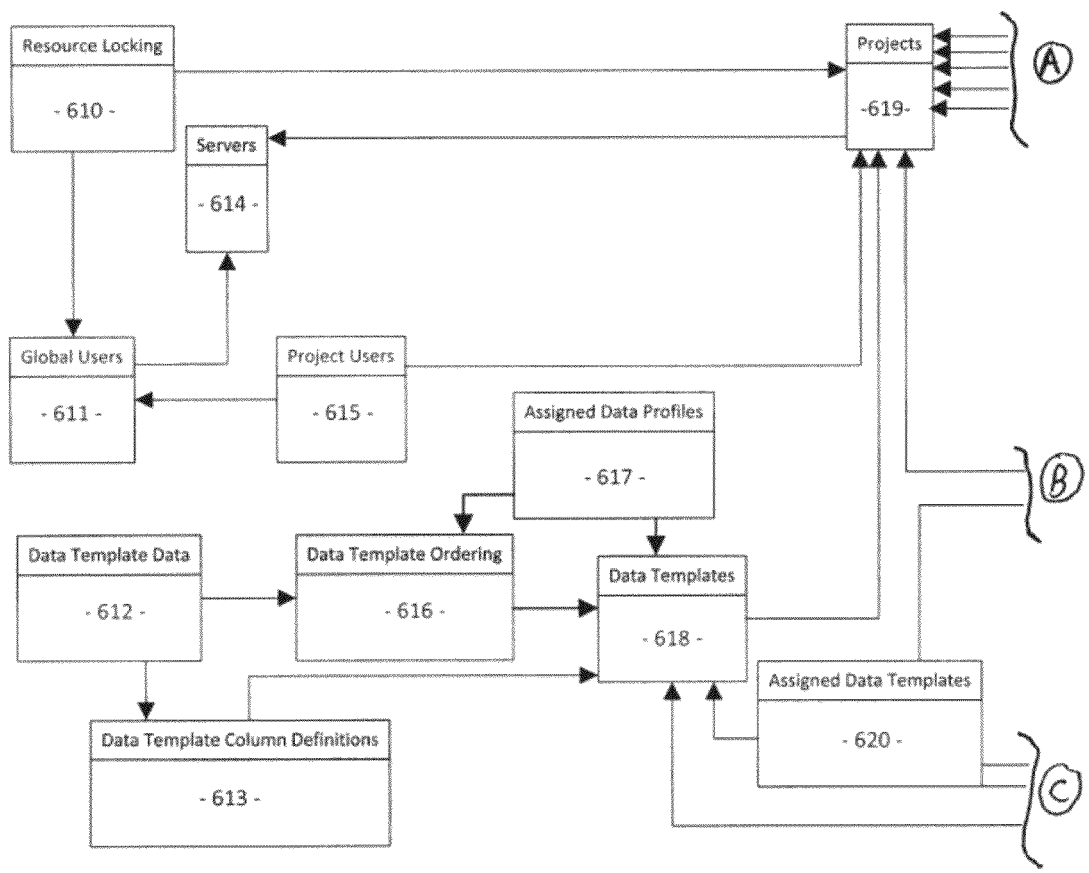

The database tables of a preferred embodiment of the present invention that are related to project and locking and authentication information, as well as data template functionalities, will now be described in further detail with reference to FIG. 6B. In particular, resource locking table 610 contains information about objects that are currently in use by a user, permitting the present invention to use common database resources in a multi-user environment. Global users table 611 contains a list of users that can be associated with a project. This table also allows an administrator to view, edit, add, and delete user information. Data template data table 612 contains the actual data from all of the data templates, allowing all data templates to be stored within one database table. Data template column definitions table 613 contains column ordering and column name information for all data templates. This permits reconstruction of all data template columns in their proper and expected ordering.

Servers table 614 contains high lever information regarding the server that is associated with a particular project, including the server's Uniform Resource Locator ("URL"). This permits projects to be organized by server. Project Users table 615 contains permissions information that governs which projects a particular user will be permitted to access. Data Template Ordering table 616 contains information relating to the sequencing, or ordering of the data within the data templates. This permits reconstruction of all data profiles in their expected order. Assigned data profiles table 617 contains the assigned data profiles that a user makes in constructing an executable, permitting users to assign particular data profiles to a given executable. Data templates table 618 contains high-level information relating to data templates. This permits users to assign identifying descriptions to individual data templates. Projects table 619 contains high-level information relating to projects. This permits the user to separate test assets by project. Test assets include folders, test actions, test scenarios, and test executables. Assigned data templates table 620 contains information identifying where each particular data template is being used. This permits the present invention to automatically delete data templates from test assets when needed.

Figure 6C:
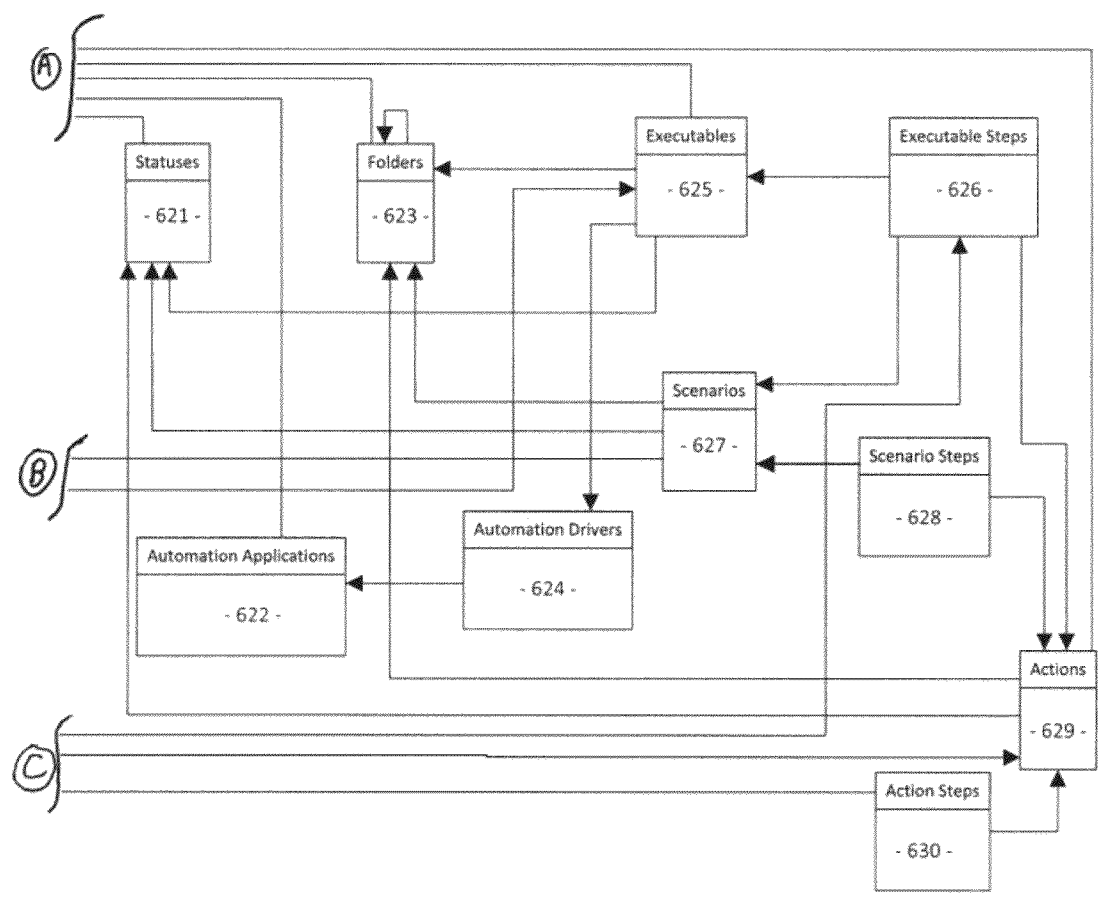

The database tables of the present invention that relate to test planning and execution functionalities will now be described in further detail with reference to FIG. 6C. In particular, statuses table 621 contains a list of all statuses maintained by the present invention within one data table, thereby facilitating future expansion of the invention software. Automated applications table 622 contains a list of all automation applications that users have defined, to date, thereby permitting executables to be automated. Folders table 623 contains a list of folders employed by the planning and executable functionality of the present invention. Automation drivers table 624 contains a list of automation drivers that users of the present invention have defined. This, in turn, permits an executable to be automated and executed. Executables table 625 contains high-level information concerning executables. Executable steps table 626 contains all executable steps. Scenarios table 627 contains high-level information concerning scenarios. Scenario steps table 628 contains scenario step information. Actions table 629 contains high-level information concerning actions. Action steps table 630 contains information concerning all action steps.

Figure 12:
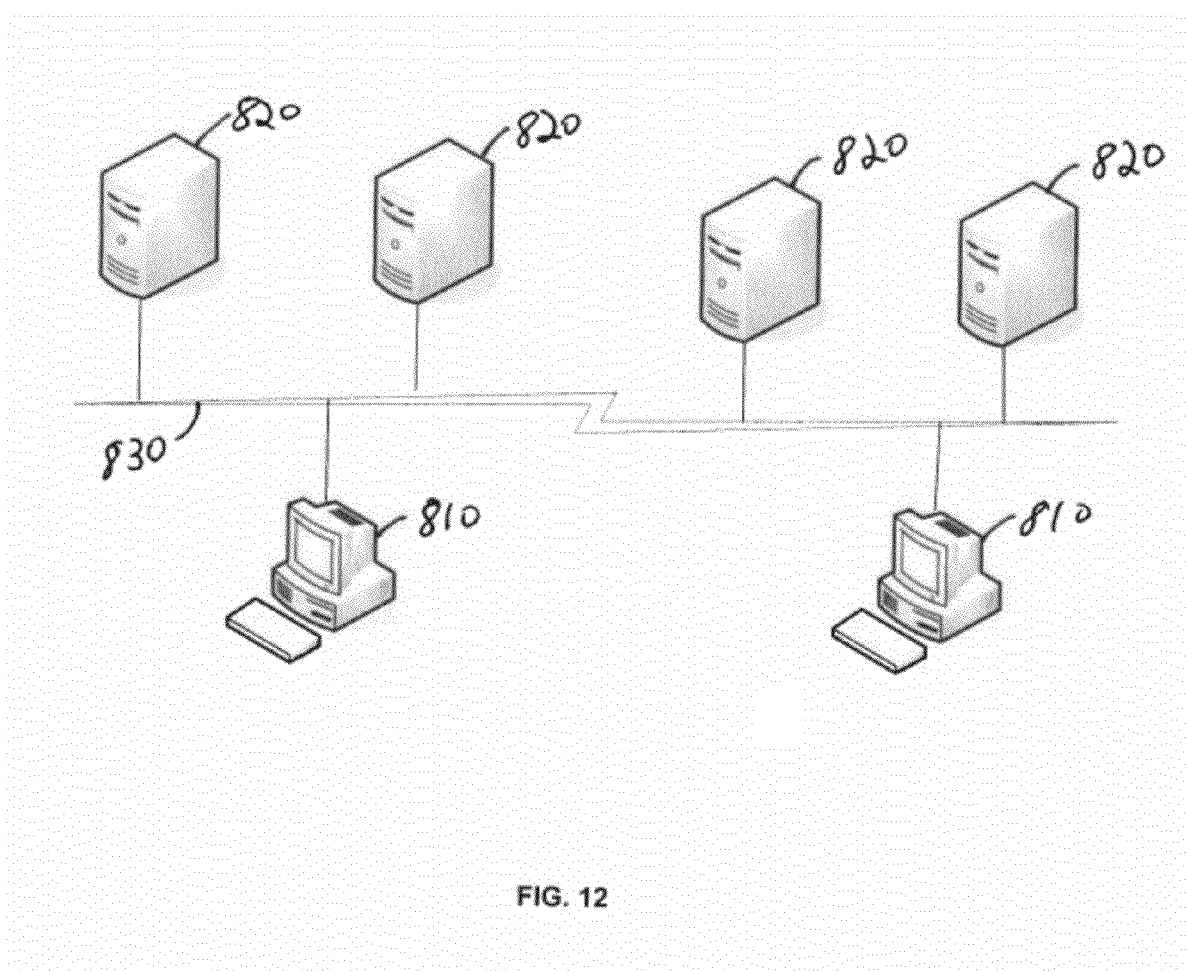
FIG. 12 is simplified diagram of the equipment and networked environment which may be associated with the present invention.

A diagram of the hardware equipment that may be associated with the present invention is shown in FIG. 12 as comprising one or more workstations 810, one or more servers 820, and communication network 830 interconnecting the various workstations and servers. Each workstation 810 runs an executable program that provides the user interface of the present invention, as well as the underlying, software-based infrastructure that permits users to plan tests, execute tests, and review test histories, amongst other functions of the present invention described above. As indicated above with reference to FIG. 6B, server table 614 contains high level information regarding a server that is associated with a particular project, including the server's URL. As a result, a given workstation 810 may access a plurality of servers 820 when performing test operations for various projects. In addition, one or more servers 820 may operate as a database server for the repository database of the present invention, and may be implemented, for example, using database server software such as Oracle, Microsoft SQL Server, or MySQL.

Figure 13:
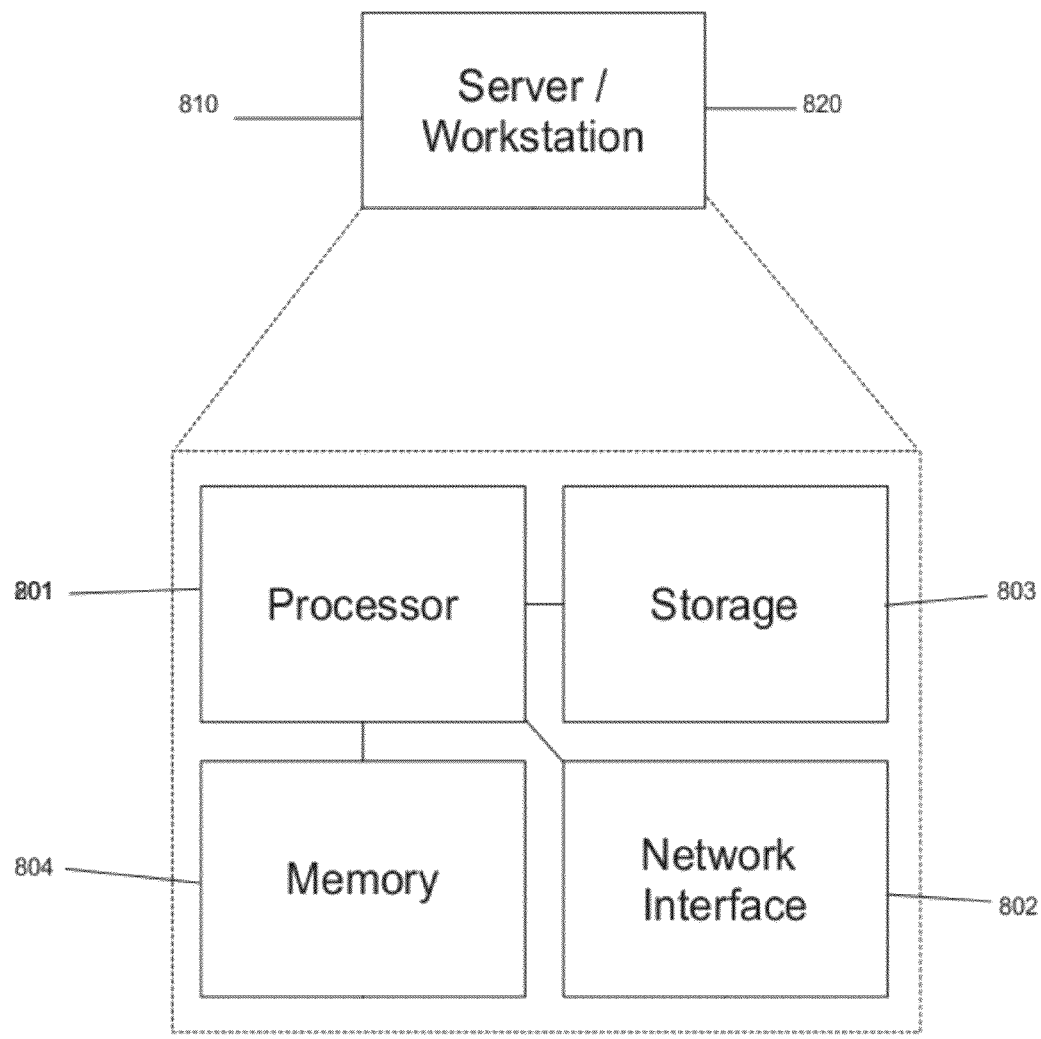
FIG. 13 is a simplified diagram of the servers and workstations of FIG. 12.

Referring to FIG. 13, each workstation 810 and server 820 associated with the present invention is shown as preferably comprising several hardware components, including processor 801, network interface 802, storage 803, and memory 804. These components cooperate, in conjunction with associated firmware and software, to perform the tasks required of each workstation 810 and server 820.

As is apparent from the foregoing, the present invention enables full reuse of tests and test data via a centralized, shared repository. Test actions, test scenarios, test data, and automation scripts are all fully reusable test assets under the present invention. The late binding of actual test data, in particular, to individual test steps permits the full reuse of test data.

It will be understood that modifications and variations may be effected without departing from the spirit and scope of the present invention. It will be appreciated that the present disclosure is intended as an exemplification of the invention and is not intended to limit the invention to the specific embodiment illustrated and described. The disclosure is intended to cover, by the appended claims, all such modifications as fall within the scope of the claims.

What is claimed is:

1. A system for testing a software application supporting reuse of test assets, the system comprising:
   a testing repository database, the testing repository database storing reusable action object data, test step object data, predetermined categories of test data, reusable test scenario data, and test driver information;
   a user interface permitting a user to construct a test plan by assembling together at least one of a plurality of reusable action objects and a plurality of reusable scenario objects in a sequence to create a plurality of reusable executable step objects collectively forming a test executable, the reusable executable step objects having associated predetermined categories of test data; and
   means for late binding instances of actual test data to the predetermined categories of test data following completion of test planning and immediately prior to test execution.

2. The system according to claim 1, wherein the test execution is performed in an automated manner.

3. The system according to claim 2, wherein the means for late binding instances of actual data comprises an automation driver identified by the user accessing a list of action scripts, passing instances of actual test data to the action scripts in order to bind instances of actual test data to the predetermined categories of test data.

4. The system according to claim 1, wherein the test execution is performed manually.

5. The system according to claim 1, wherein at least one of the executable steps includes a data template.

6. The system according to claim 5, wherein the means for late binding instances of actual test data comprises populating the data templates associated with executable steps with corresponding instances of actual data.

7. The system according to claim 1, wherein the user interface comprises a graphical user interface.

8. The method according to claim 1, wherein the user interface comprises a graphical user interface.

9. The system according to claim 1, wherein:
   each reusable step object comprises at least one of at least one reusable scenario object and at least one reusable action object;
   each reusable scenario object comprises at least one of at least one reusable action object and at least one reusable scenario object;
   at least one reusable action object comprises at least one step object; and
   at least one step object comprises at least one predetermined category of test data.

10. The system according to claim 1, wherein the means for late binding instances of actual test data comprises, at a test step level and upon test step execution, individually assigning any number of selected instances of actual test data to each individual executable step object from any number of predetermined categories of test data.

11. The system according to claim 1, wherein the user interface permits a user to assign instances of actual test data from the predetermined categories of test data pursuant to an executable test.

12. A method for testing a software application supporting reuse of test assets, the method comprising:
   providing a testing repository database, the testing repository database storing reusable action object data, test step object data, predetermined categories of test data, reusable test scenario object data, and test driver information;
   providing a user interface permitting a user to construct a test plan by assembling together at least one of a plurality of reusable action objects and a plurality of reusable scenario objects in a sequence to create a plurality of reusable executable step objects collectively forming a test executable, the reusable executable step objects having associated predetermined categories of test data; and
   late binding assigned instances of actual test data to the predetermined categories of test data following completion of test planning and immediately prior to test execution.

13. The method according to claim 12, wherein the test execution is performed in an automated manner.

14. The method according to claim 13, wherein the step of late binding assigned instances of actual data comprises activating an automation driver specified by the user to access a list of action scripts, passing instances of actual test data to the action scripts in order to bind instances of actual test data from the predetermined categories of test data to action scripts.

15. The method according to claim 12, wherein the test execution is performed manually.

16. The method according to claim 15, wherein the user interface permits a user to manually assign instances of actual test data from the predetermined categories of test data pursuant to a manual mode of test execution.

17. The method according to claim 12, wherein at least one of the executable steps includes a data template.

18. The method according to claim 17, wherein the step of late binding instances of actual test data comprises the step of populating the data templates associated with executable steps with corresponding instances of actual data.

19. The method according to claim 12, wherein:
   each reusable step object comprises at least one of at least one reusable scenario object and at least one reusable action object;
   each reusable scenario object comprises at least one of at least one reusable action object and at least one reusable scenario object;
   each reusable action object comprises at least one step object; and
   at least one step object comprises at least one predetermined category of test data.

20. The method according to claim 12, wherein the step of late binding assigned instances of actual test data comprises, at a test step level and upon test step execution, individually assigning instances of actual test data to each individual executable step object that includes a predetermined category of test data.

\* \* \* \* \*